United States Patent [19]
Smith

[11] 3,930,635
[45] Jan. 6, 1976

[54] LEAK-PROOF ROTARY, PLUG-TYPE FLUID CONTROL VALVE

[75] Inventor: Russell G. Smith, Cincinnati, Ohio

[73] Assignee: Xomox Corporation, Cincinnati, Ohio

[22] Filed: July 26, 1974

[21] Appl. No.: 492,034

[52] U.S. Cl. ............ 251/214; 251/317; 251/335 A
[51] Int. Cl.² ...................... F16K 5/16; F16K 41/12
[58] Field of Search .......... 251/214, 309, 312, 314, 251/316, 317, 335 R, 335 A, 335 B; 137/246.12, 246.15, 246.18, 246.22

[56] References Cited
UNITED STATES PATENTS

| | | | |
|---|---|---|---|
| 2,029,438 | 2/1936 | Nordstrom | 251/335 A X |
| 3,132,838 | 5/1964 | Smith | 251/214 |
| 3,521,856 | 7/1970 | Smith | 251/317 X |

Primary Examiner—Henry T. Klinksiek
Assistant Examiner—Richard Gerard
Attorney, Agent, or Firm—J. Warren Kinney, Jr.

[57] ABSTRACT

External leakage around the actuator-stem of a plug valve is prevented by the application of forces to the lower surface of the valving member whereby to normally advance and maintain sealing surfaces on the upper end of the valving member against and in sealing relationship with a diaphragm.

6 Claims, 4 Drawing Figures

LEAK-PROOF ROTARY, PLUG-TYPE FLUID CONTROL VALVE

BACKGROUND OF THE INVENTION

1. Field of the Invention

The present invention is directed to a lined plug valve, and improved means for sealing the valve against leakage. A sealant is introduced into the chamber defined by the bottom of the liner, the bottom of the plug and the body member, providing forces which continuously urge the plug toward and in sealing relationship with a diaphragm at the top of the body member, ensuring against external leakage thereof.

2. Description of the Prior Art

The subject invention comprises an improvement over the lined plug valve of my U.S. Pat. No. 3,521,856, assigned to the assignee of this application.

The valve of the subject invention differs from the valve of U.S. Pat. No. 3,521,856 in that the sealant surrounding the upper end of the valving member of said patent is disposed in open communication with sealant disposed in a chamber adjacent the lower end of the valving member, and wherein the cross-sectional area of the lower end of the valving member is greater than the cross-sectional area of those portions of the upper end of the valving member which are subjected to sealant.

SUMMARY OF THE INVENTION

The plug valve of the present invention comprises, in combination, a body member having an open upper portion and a closed lower portion, a valving member in the form of a rotary plug, and a sealing member in the form of a stationary liner intermediate the peripheral face of the plug and the body member. Each of the members include ports or flow passages which are placed in and out of communication with one another upon selective partial rotation of the plug relative to the body member and the liner.

The upper end of the valving member terminates in a centrally disposed, outwardly projecting actuator stem wherein an annular seat or shoulder circumscribes the upper end of the plug adjacent the actuator stem. A flexible, fluid-impervious diaphragm having a central opening for accommodating the actuator stem spans the upper end of the plug and terminates in an outer marginal portion which overlies the upper portion of the body member. A cover member is placed over the diaphragm and secured to the body member, ensuring against outward axial movement of the plug relative to the body member.

A chamber is defined by the lower end of the liner, the lower end of the plug and the lower, closed end of the body member, wherein means in the form of a fluid media introduced into the chamber continuously urge the plug toward the diaphragm for disposing the annular seat of the plug in contacting, leakproof engagement with the diaphragm.

An equalizer passageway is provided in the plug establishing fluid communication of said chamber with a second chamber between the top of the plug and the diaphragm.

It is a primary object of the present invention to provide means continuously urging the valving member into sealing, leak-proof engagement with the diaphragm of a rotary, plug-type, fluid control valve.

It is further an object of the invention to provide means equalizing the pressure in the chambers adjacent the top and bottom of the valving member.

While certain features and advantages of the valve of the present invention have been particularly illustrated and described in detail, it should be understood that such are not intended to limit scope and spirit of the invention as defined by the claims appended hereto.

DESCRIPTION OF THE PREFERRED EMBODIMENTS

Figure 1:
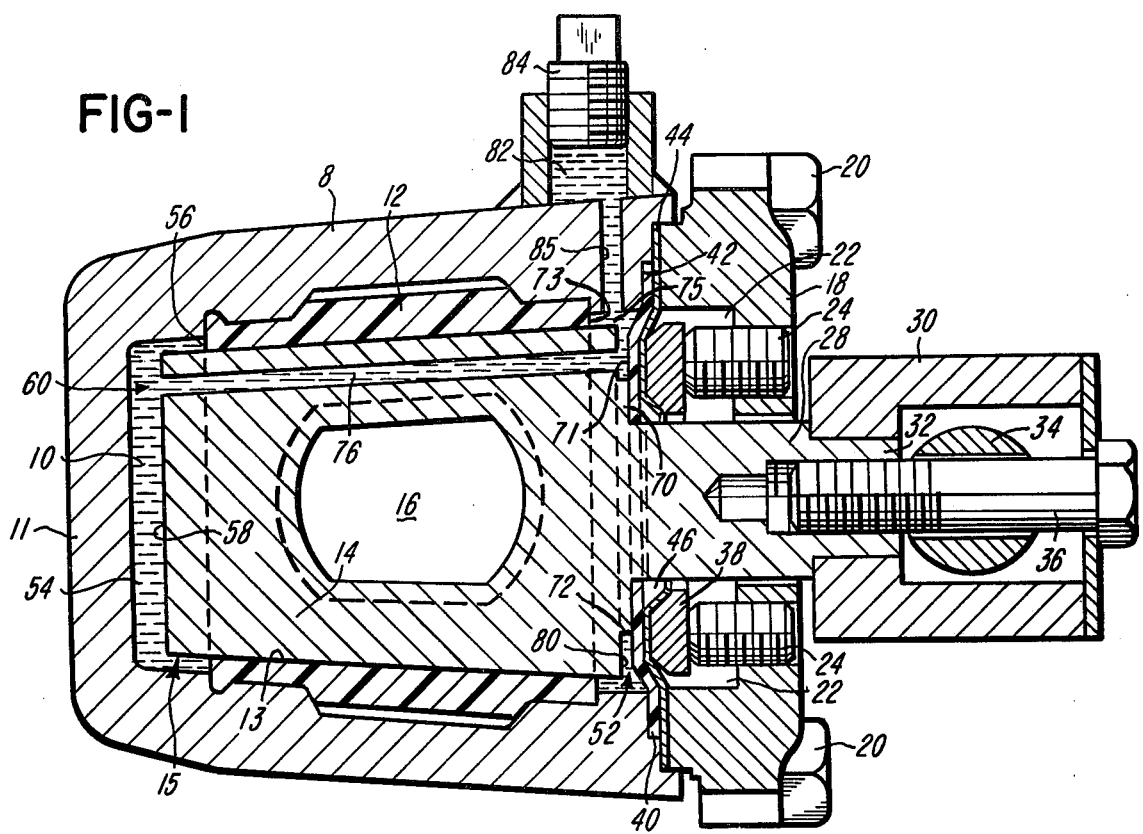
FIG. 1 is a cross-section of the improved valve taken along a vertical axis of the rotary valving member.

The rotary type plug valve of the present invention comprises a body member 8 formed preferably from a suitable metal and having a chamber in the form of bore 10 which accommodates a correspondingly shaped sealing member such as, by way of example, stationary liner or sleeve 12. A valving member in the form of plug 14 is inserted in bore 10 and includes an outer peripheral surface 15 which corresponds to the inner peripheral surface 13 of liner 12, effecting a fluid-tight relationship therebetween. The lower end of the bore is closed by end wall 11 of the body member and defines a recess or chamber 54 bounded by wall 11, bore 10, lower face 58 of plug 14 and lower end 56 of liner 12.

Plug 14 has a through opening or port 16 defining a flow passageway which is adapted to be placed in and out of registry with ports in the body member and liner incident to rotation of the plug, as is common with rotary type plug valves. Liner 12 is fixed against axial and rotational movement within bore 10 in any suitable manner. Generally, the liner may be formed from a plastic material such as Teflon, a polytetrafluoroethylene, or an equivalent impermeable plastic presenting to the plug a substantially resilient, wear-resistent, inherently slippery contacting surface 13 capable of making a fluid-tight seal with the smooth peripheral surface 15 of the plug.

The upper, open end of bore 10 is closed by cover member 18 mounted upon the body member by means of cap screws 20, and defines means for mounting the valving member for rotational movement relative to the body member. The cover member has a central bore 22 in co-axial relationship with the axis of rotation of plug 14, and at its outer end is provided with several openings to accommodate adjusting screws 24 arranged parallel to and equidistant from the plug axis. Central bore 22 of the cover member loosely accommodates the rotational actuating stem 28 of the valving plug.

Stem 28 is secured to and projects outwardly from the upper end of plug 14 and extends through cover member 18. Cap 30 is keyed to stem 28 at flat 32 and carries an actuating lever 34 for rotating the plug relative to the body member. Screw 36 is employed to secure lever 34 to cap 30 in any suitable manner.

The plug 14 is positioned against outward axial movement and is maintained in abutting, sliding relationship with liner 14 by the force of adjusting screws 24 bearing against pressure ring 38, which is preferably of hard metal and overlies a liquid impervious diaphragm that separates bore 10 from cover chamber 22. Generally, the diaphragm comprises a centrally apertured disc 40 of Teflon or other suitable impervious material which surrounds actuator stem 28 and is clamped between cover member 18 and body member 8 at its outer peripheral margin as at 42. A diaphragm-reinforcing or protecting member in the form of flexible, metallic disc 44 or the like is interposed between the diaphragm 40, the pressure ring 38 and cover 18 to distribute the force supplied by the pressure ring and screws 24. Protective disc 44 is centrally apertured at 46 to loosely accommodate the actuator stem, and where desired substantially covers the upper surface of diaphragm 40, wherein the protective disc is marginally clamped with the diaphragm between cover member 18 and body member 8 as at 42. It will be noted that ring 38 and disc 44 are positioned such that once screws 24 are tightened, those portions of diaphragm 40 between its outer marginal edge (at 42) and actuator stem 28 are fixed against outward axial movement relative to plug 14. Therefore, cover member 18, diaphragm 40, disc 44 and ring 38, when properly applied to body member 8, provide a fixed, bearing surface for the upper end of plug 14. In this regard, the plug includes an annular seat 70 which is maintained in abutting relationship with the under surface 71 of the diaphragm by force of screws 24.

Beyond the peripheral edge 72 of seat 70 the end-face of plug 14 is annularly cut away or relieved at 52 and provides a relief space between the plug end and the adjacent overlying portion of the undersurface of diaphragm 40, defining a second chamber 75 which is bounded by upper end 73 of the sealing member 12, the inner peripheral surface of bore 10, the outer peripheral surface 15 and annular face 80 of plug 14, and the under surface 71 of diaphragm 40.

Through passageway 76 is provided in plug 14 to establish fluid communication between chambers 54 and 75 for maintaining the contents thereof in a state of equilibrium. It will be noted that end-face 58 of the plug presents a surface to chamber 54 which is of a substantially larger area than that present by annular face 80 to chamber 75. Since the contents of the chambers are in equilibrium, the total force applied to the larger area of end-face 58 exceeds the total force applied to the lesser area of annular face 80, resulting in a continuous upward thrust against the end-face, urging seat 70 into contacting, leak-proof engagement with the fixed bearing surface provided by under surface 71 of diaphragm 40.

In the event that the pressure of the controlled fluid against the plug, when closed to ports in the liner and body member, is of such magnitude to tend to shift or move the plug toward the downstream port of the body member, the controlled fluid could, under extreme conditions leak from the upstream port toward the sealant-filled chamber 54 and 75. Absent the top seal of my U.S. Pat. No. 3,521,856, such fluid could escape from the valve along the upper end of the plug thence through the actuator stem receptive aperture of the diaphragm and along the actuator stem.

The sealing arrangment of my aforesaid patent is greatly enhanced by the introduction of sealing fluid 60 into chambers 54 and 75 and passageway 76, establishing a viscous seal at the upper end of plug 14 in much the same manner as my aforementioned earlier patent. Of course, it will be understood that the difference in surface areas of the upper and lower faces of the plug which are presented to chambers 54 and 75, respectively, results in an upward thrust urging seat 70 of the plug into contacting, leak-proof engagement with the fixed bearing surface 71 of diaphragm 40.

Generally, the sealing fluid is a heavy, viscid grease, a silicone grease, or caulk-like compound which is characterized by high viscosity and great resistance to dilution by the fluid being controlled by the valve. As will be readily appreciated, various forms of sealing fluids having the required characteristics are available, and may be employed in accordance with the present invention.

There are several added advantages which result from use of sealing fluid 60 to supplement the sealing arrangement established by equalizer passageway 76. Specifically, if plug 14 is adjusted downwardly toward end wall 11 of the body member by tightening screws 24 against ring 38, the resulting increased pressure of the sealing fluid would be equal in each chamber, and the total force applied to end-face 58 and annular face 80 would increase proportionately, wherein the sealing relationship between undersurface 71 and seat 70 would be further enhanced by the increased upward thrust on plug 14.

It is also significant that use of a viscid sealing fluid precludes any of the fluid controlled by the valve from leaking into and being entrapped in either of chambers 54 and 75. This is of particular importance when the controlled fluid is of the type which includes monomers which tend to polymerize when entrapped in the valve, making subsequent operation of the valve ineffective.

As illustrated in FIG. 1, sealing fluid 60 may be introduced into the chambers and passageway by means of reservoir 82 applied to the body member and having a screw plug 84 for forcing the fluid through passageway 85 into chamber 75. The reservoir and screw plug constitute means for maintaining the sealing fluid under super-atmospheric pressure at all times, as well as means for replacement of any sealing fluid which may be depleted or lost under abnormal conditions to which the valve might be exposed. It should, of course, be understood that reservoir 82 may be applied to body member 8 at any suitable location which is conveniently in communication with either of chambers 54 or 75.

Figure 2:
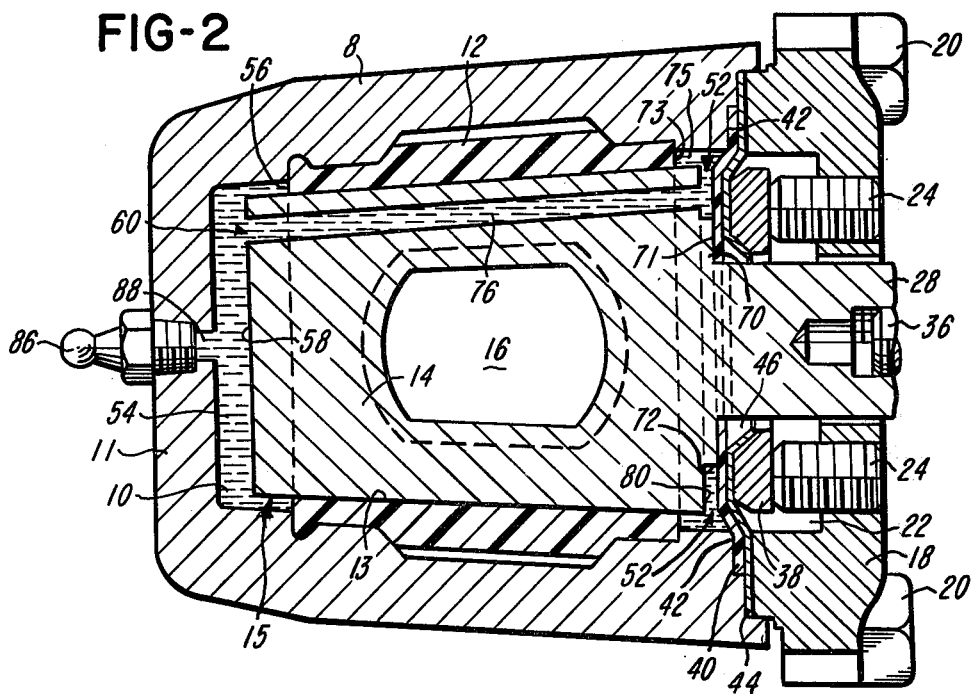
FIG. 2 is a view somewhat similar to FIG. 1 showing a modification thereof.

Further, as illustrated in FIG. 2, a high-pressure, Zerk type grease fitting 86, through channel 88, in end wall 11, may be utilized in lieu of reservoir 82 and screw plug 84.

Figure 4:
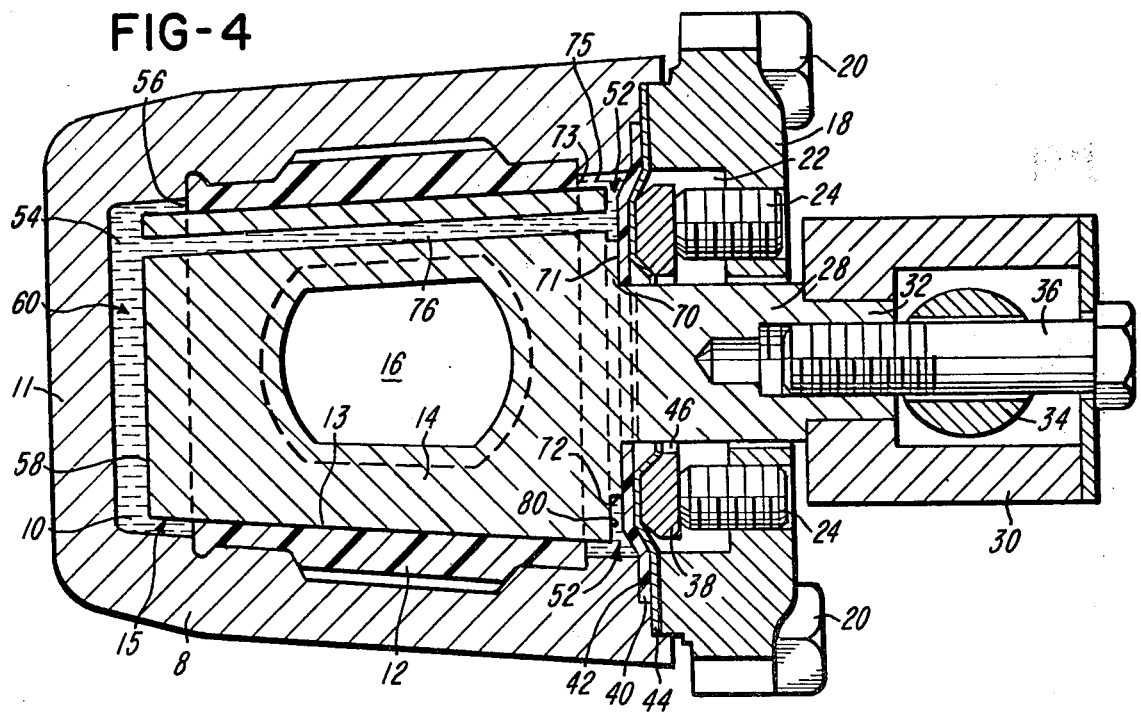
FIG. 4 is a sectional view showing a third modification.

It should, of course, be understood that if means for easily replenishing the sealing fluid is not required, a permanently sealed plug valve such as is illustrated in FIG. 4 may be utilized. In the assembly of the valve of FIG. 4, liner 12 is first introduced into and properly seated within bore 10. Plug member 14 is inserted in the bore and is properly seated relative to liner 12. Sealing fluid 60 is then suitably introduced into the bore prior to application of cover member 18, diaphragm 40, disc 44 and ring 38 to body member 8. As the diaphragm is urged in place by tightening screws 24, and until such time when annular seat 70 engages undersurface 71 thereof, any excess sealant can escape through the diaphragm aperture and along actuator stem 28.

Figure 3:
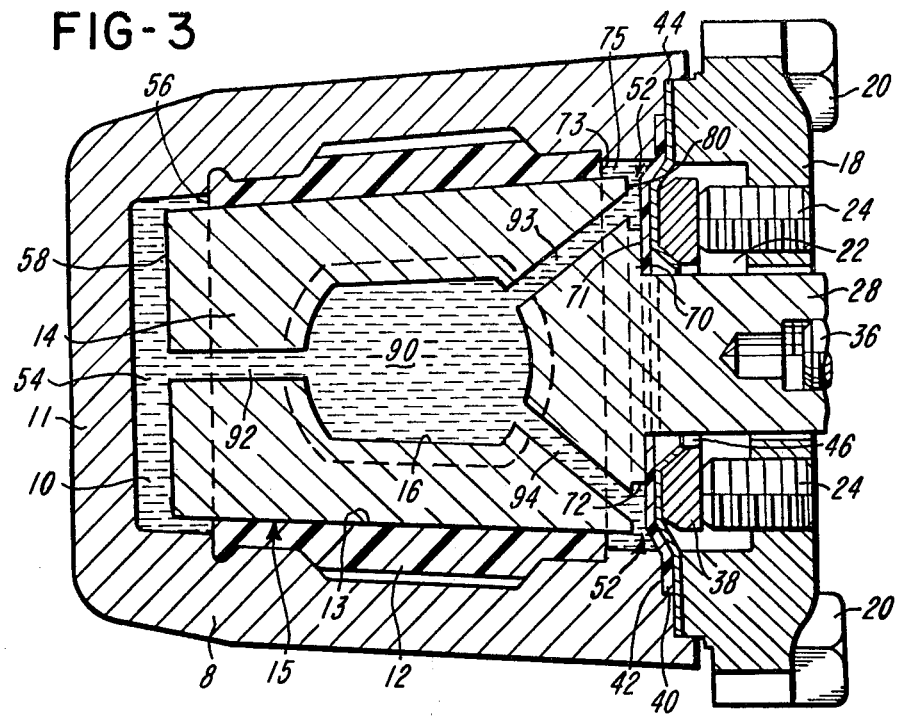
FIG. 3 is a view showing a second modification.

It should be noted in each of the embodiments illustrated in FIGS. 1, 2 and 4, that sealant passage 76 is isolated from port 16 of the plug. In some instances it is desirable that the fluid flowing through the valve be utilized as the sealing media. Therefore, the rotary plug valve of the present invention may be modified as illustrated in FIG. 3, wherein isolated passageway 76 is replaced by a series of passageways 92, 93 and 94 which radiate outward from port 16 to the upper and lower ends of plug 14, establishing fluid communication of chambers 54 and 75 with port 16. Controlled fluid 90 in port 16 is introduced into and fills chambers 54 and 75, and as with sealing fluid 60, provides an upward thrust against end-face 58 of the plug, constantly urging seat 70 into contacting, leak-proof engagement with the fixed bearing surface provided by under-surface 71 of diaphragm 40.

In conclusion, it should be noted that the rotary type plug valve of the present invention is readily distinguishable from plug type valves which are commonly referred to as lubricated valves, wherein a lubricant is provided between the peripheral surfaces of the plug and the adjacent peripheral surfaces of the plug-receptive bore of the valve body. In the present invention, the sliding, rotational relationship between peripheral surface 13 of the sealing member 12 and peripheral surface 15 of the plug member 14 is not effected by the fluid sealant 60, and fluid sealant is not in contact with the media passing through the valve. The sealing arrangement of the present invention is specifically directed to means for establishing a continuous upward thrust against the lower end of a plug valving member, urging the upper end thereof into contacting, leak-proof engagement with the fixed bearing surface provided by the under-surface of the diaphragm of the valve. With this specific purpose in mind, I have provided an equalizer passageway in the plug of the valve for establishing fluid communication between the fluid-filled chambers adjacent the upper and lower end faces of the plug. Since the lower end-face presents a larger area to the lower chamber than that presented by the upper, annular end-face to the upper chamber, the total force applied to the lower end-face is greater, resulting in an upward thrust on the plug, effectively sealing the valve against leaks about the diaphragm aperture.

What is claimed is:

1. A rotary, plug-type fluid-control valve comprising, in combination, a body member having an open upper portion and a closed lower portion, a valving member and a sealing member, wherein each of said members include flow passages, means mounting the valving member for rotational movement relative to the body and sealing members to place the flow passages of the valving member in and out of communication with the flow passages of said body and sealing members; said sealing member interposed between the peripheral face of the valving member and body member; a chamber defined by the lower end of the sealing member, the lower end of the valving member and the lower portion of said body member; the upper end of said valving member terminating in a centrally disposed, outwardly projecting actuator stem; an annular seat circumscribing the upper end of said valving member adjacent said actuator stem; a flexible, fluid-impervious diaphragm having a central opening therein accommodating the actuator stem, said diaphragm spanning the upper end of the valving member and terminating in an outer marginal portion which overlies the upper portion of the body member; means securing the marginal portion of the diaphragm relative to the body member; means positioning those portions of the diaphragm between its outer marginal edge and the actuator stem of the valving member against outward axial movement relative to said valving member; an annular recess circumscribing the peripheral-adjacent portion of the upper end of the valving member; wherein a second chamber is defined by the upper end of the sealing member, the annular recess in the valving member the upper portion of the body member and the undersurface of the diaphragm; a passageway establishing continuous open communication between said first-mentioned and second chambers; fluid media in and filling each of said chambers and the passageway therebetween; wherein the fluid media in the first-mentioned chamber impinges against the lower end of the valving member for uging said valving member toward the diaphragm for disposing the annular seat which circumscribes the upper end of the valving member in contacting, leak-proof engagement with said diaphragm; and wherein the fluid media in the second chamber impinges against the diaphragm intermediate the said annular seat and the locus of securement of the marginal portion of the diaphragm to the body member, to resist flow of valve controlled fluid past said annular seat and along the actuator stem of the valving member.

2. A valve as called for in claim 1, wherein the passageway is disposed entirely within the valving member, and wherein the valve includes means for introducing fluid media, under pressure, into said chambers and passageway.

3. A valve as called for in claim 1, wherein the passageway interconnecting said chambers is, at all times, completely isolated from the fluid passageways of the valve.

4. A valve as called for in claim 1, wherein the passageway interconnecting said chambers is, at all times, in open communication with the flow passage of the valving member.

5. A valve as called for in claim 1, wherein the area of the lower end of said valving member which is exposed to fluid media within said first-mentioned chamber exceeds the area of the upper portion of the valving member which is exposed to fluid media within the second chamber.

6. A valve as called for in claim 1, wherein the sealing member comprises a self-lubricating, inert, polyfluoroethylene material.

* * * * *